(12) United States Patent
Song et al.

(10) Patent No.: US 9,338,172 B2
(45) Date of Patent: May 10, 2016

(54) ENHANCED IPSEC ANTI-REPLAY/ANTI-DDOS PERFORMANCE

(71) Applicant: Futurewei Technologies, Inc., Plano, TX (US)

(72) Inventors: Jifei Song, San Jose, CA (US); Xiaoyong Yi, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 316 days.

(21) Appl. No.: 13/925,415

(22) Filed: Jun. 24, 2013

(65) Prior Publication Data

US 2014/0281530 A1    Sep. 18, 2014

Related U.S. Application Data

(60) Provisional application No. 61/779,990, filed on Mar. 13, 2013.

(51) Int. Cl.
H04L 29/06 (2006.01)
H04L 1/00 (2006.01)

(52) U.S. Cl.
CPC ............ *H04L 63/123* (2013.01); *H04L 1/0061* (2013.01); *H04L 63/12* (2013.01)

(58) Field of Classification Search
CPC ..... H04L 63/12; H04L 63/123; H04L 1/0061; H04L 47/34; H03M 13/09
See application file for complete search history.

(56) References Cited

U.S. PATENT DOCUMENTS

| 5,007,053 A * | 4/1991 | Iyer ..................... G06F 11/1008 714/6.11 |
| 6,252,891 B1 * | 6/2001 | Perches ......................... 370/503 |
| 6,480,511 B1 * | 11/2002 | Petty ............................ 370/509 |
| 6,571,291 B1 * | 5/2003 | Chow ..................... H04L 29/06 370/389 |
| 6,584,544 B1 * | 6/2003 | Morley ................. G06F 3/0601 711/114 |
| 6,742,125 B1 * | 5/2004 | Gabber et al. .................... 726/4 |

(Continued)

FOREIGN PATENT DOCUMENTS

CN          104050431 A  *  9/2014
JP       2010187327 A  *  8/2010

OTHER PUBLICATIONS

Kent, "IP Authentication Header", rfc 4302, Dec. 2005, 34 pages.*

(Continued)

*Primary Examiner* — Andrew Nalven
*Assistant Examiner* — Walter Malinowski
(74) *Attorney, Agent, or Firm* — Conley Rose, P.C.; Grant Rodolph; Adam J. Stegge

(57) ABSTRACT

A method for authenticating an Internet Protocol Security (IPsec) packet, wherein the method comprises, receiving the IPsec packet via an input port, performing a Sequence-Integrity Check Value (SEQ-ICV) check that validates a sequence number within the IPsec packet, and performing an Integrity Check Value (ICV) check that validates a checksum within the IPsec packet, wherein the SEQ-ICV check is performed before the ICV check. In yet another example embodiment, an apparatus for transmitting an IPsec packet, comprising a processor, and a transmitter coupled to the processor, wherein the transmitter is configured to transmit an IPsec packet that comprises a header that comprises a sequence number field that provides a sequence number, and a payload that comprises one or more SEQ-ICV segments used to authenticate the sequence number within the IPsec packet.

16 Claims, 10 Drawing Sheets

(56) References Cited

U.S. PATENT DOCUMENTS

| | | | |
|---|---|---|---|
| 6,931,581 B1* | 8/2005 | Cassiday et al. | 714/758 |
| 6,978,384 B1* | 12/2005 | Milliken | 726/26 |
| 6,996,712 B1* | 2/2006 | Perlman et al. | 713/161 |
| 7,003,118 B1* | 2/2006 | Yang | H04L 63/164 370/393 |
| 7,224,686 B1* | 5/2007 | Doskow et al. | 370/352 |
| 7,483,423 B2* | 1/2009 | Grewal | H04L 63/123 370/252 |
| 8,549,646 B2* | 10/2013 | Stavrou et al. | 726/24 |
| 2002/0066011 A1* | 5/2002 | Vialen et al. | 713/150 |
| 2002/0077077 A1* | 6/2002 | Rezvani et al. | 455/410 |
| 2002/0089979 A1* | 7/2002 | Abdulkader | H04L 63/0428 370/389 |
| 2002/0129087 A1* | 9/2002 | Cachin et al. | 709/200 |
| 2003/0188231 A1* | 10/2003 | Cronce | G06F 21/51 714/52 |
| 2003/0210788 A1* | 11/2003 | Billhartz et al. | 380/270 |
| 2004/0034773 A1* | 2/2004 | Balabine | A63F 13/12 713/168 |
| 2004/0193876 A1* | 9/2004 | Donley | H04L 1/1607 713/162 |
| 2004/0205332 A1* | 10/2004 | Bouchard et al. | 713/153 |
| 2005/0193191 A1* | 9/2005 | Sturgis | 713/155 |
| 2005/0268341 A1* | 12/2005 | Ross | 726/26 |
| 2006/0047972 A1* | 3/2006 | Morais | 713/190 |
| 2006/0114909 A1* | 6/2006 | Uzrad-Nali et al. | 370/394 |
| 2006/0212520 A1* | 9/2006 | Logue et al. | 709/206 |
| 2006/0242535 A1* | 10/2006 | Barthel et al. | 714/758 |
| 2007/0011561 A1* | 1/2007 | Ambilkar et al. | 714/758 |
| 2007/0165638 A1* | 7/2007 | Hasani | H04L 47/10 370/392 |
| 2007/0214502 A1* | 9/2007 | McAlister | H04L 63/0428 726/15 |
| 2008/0089250 A1* | 4/2008 | Jung | 370/276 |
| 2008/0126559 A1* | 5/2008 | Elzur | H04L 63/0464 709/232 |
| 2008/0184041 A1* | 7/2008 | Jakubowski et al. | 713/194 |
| 2009/0061820 A1* | 3/2009 | Patel et al. | 455/411 |
| 2009/0103485 A1* | 4/2009 | Singh et al. | 370/329 |
| 2009/0181643 A1* | 7/2009 | Thakare | 455/411 |
| 2009/0207772 A1* | 8/2009 | Ehara et al. | 370/312 |
| 2010/0306612 A1* | 12/2010 | Tang | 714/752 |
| 2011/0078783 A1* | 3/2011 | Duan et al. | 726/15 |
| 2011/0314274 A1* | 12/2011 | Swartz | H04L 63/0428 713/160 |
| 2012/0236728 A1* | 9/2012 | Dalmau | H04L 12/2697 370/241 |
| 2013/0132730 A1* | 5/2013 | Falk | 713/181 |
| 2013/0139252 A1* | 5/2013 | Paranjape et al. | 726/22 |
| 2014/0026022 A1* | 1/2014 | Hill et al. | 714/807 |
| 2014/0040633 A1* | 2/2014 | Leleu | 713/189 |

OTHER PUBLICATIONS

Zhang, "A Multi-Layer IPsec Protocol", 9th USENIX Security Symposium Paper 2000, pp. 213-228.*

"How IPSec Works", Mar. 28 2003, 36 pages.*

Kent, "IP Encapsulating Security Payload (ESP)", rfc 4303, 44 pages.*

Song, "IPsec sequence number integrity check value", IPSECME working group, Jul. 8, 2013, 10 pages.*

Stein, "TDM over IP ", Oct. 26, 2003, 27 pages.*

Kent, S., et al., "Security Architecture for the Internet Protocol," Network Working Group, RFC 4301, Dec. 2005, 102 pages.

Kent, S., "IP Authentication Header," Network Working Group, RFC 4302, Dec. 2005, 35 pages.

Kent, S., "IP Encapsulating Security Payload (ESP)," Network Working Group, RFC 4303, Dec. 2005, 44 pages.

Kaufman, Ed., C. "Internet Key Exchange (IKEv2) Protocol," Network Working Group, RFC 4306, Dec. 2005, 100 pages.

Kaufman, C., et al., "Internet Key Exchange Protocol Version 2 (IKEv2)," Internet Engineering Task Force (IETF), RFC 5996, Sep. 2010, 139 pages.

Frankel, S., et al., "IP Security (IPsec) and Internet Key Exchange (IKE) Document Roadmap," Internet Engineering Task Force (IETF), RFC 6071, Feb. 2011, 64 pages.

* cited by examiner

ENHANCED IPSEC ANTI-REPLAY/ANTI-DDOS PERFORMANCE

CROSS-REFERENCE TO RELATED APPLICATIONS

The present application claims priority to U.S. Provisional Patent Application No. 61/779,990 filed Mar. 13, 2013 by Jifei Song, et al. and entitled "Method to Enhance IPSEC Anti-Replay/Anti-DDOS Performance," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are vulnerable to a variety of network attacks. To defend against network attacks, networks may implement security measures and control schemes, such as Internet Protocol Security (IPsec). One common network attack that a network may suffer from is a distributed denial-of-service (DDOS) attack. DDOS attacks prevent valid users from accessing and using resources from a network node (e.g. computer or server) and/or the network. One type of DDOS attack may flood the target network node and/or network with data traffic until the data traffic overloads and shuts down the network node and/or network. As a network node and/or a network becomes overburdened with processing invalid DDOS traffic, the network node and/or network is unable to respond to legitimate traffic sent by valid users. As a result, DDOS attacks may temporarily or indefinitely suspend services for a valid user (e.g. a host) connected to the network node and/or network. DDOS attacks may become costly and troublesome when the targets of the DDOS attacks are websites or services hosted on high-profile servers.

IPsec, as described in the Internet Engineering Task Force (IETF) Request for Comments (RFC) 4301, published December 2005, which is incorporated herein as if reproduced in its entirety, is one of the security protocols used for securing Internet Protocol (IP) communications within a network. To deal with DDOS attacks, IPsec implements an anti-replay window that filters data traffic based on sequence numbers encoded in an IPsec packet. Specifically, IPsec uses the anti-replay window to track sequence numbers of received packets and reject packets with sequence numbers that are too old (e.g. below the anti-replay window) or packets that have a duplicated sequence number (e.g. within anti-replay window, but marked as received). Unfortunately, the anti-replay window for the IPsec protocol is unable to filter DDOS attack packets with sequence numbers that are above the anti-replay window (e.g. the sequence number is neither considered too old, nor a duplicate). As such, the IPsec protocol typically rejects DDOS attack packets with sequence numbers above the anti-replay window by performing an Integrity Check Value (ICV) check. However, performing an ICV check may involve utilizing a hashing operation that is rather expensive in terms of resource and time consumption. If enough DDOS attack packets flood the target network node and/or a network, the constant resource and time consumption used to reject DDOS attack packets with the ICV check may cause performance degradation and service interruption for users. Therefore, a solution is needed to efficiently verify and distinguish legitimate user data traffic from DDOS attack traffic for the IPsec protocol.

SUMMARY

In one example embodiment, a receiving node authenticates an IPsec packet by receiving the IPsec packet via an input port, performing a Sequence-ICV (SEQ-ICV) check that validates a sequence number within the IPsec packet, and performing an ICV check that validates a checksum within the IPsec packet such that the SEQ-ICV check is performed before the ICV check.

In another example embodiment, a transmitting node for transmitting an IPsec packet that comprises a processor and a transmitter coupled to the processor, wherein the transmitter is configured to transmit an IPsec packet that comprises a header and a payload. The header comprises a sequence number field that provides a sequence number, and the payload comprises one or more SEQ-ICV segments used to authenticate the sequence number within the IPsec packet.

In yet another example embodiment, a transmitting node for generating and inserting a SEQ-ICV into an IPsec packet and is configured to generate a SEQ-ICV that represents a validity check for a sequence number located within the IPsec packet, partition the SEQ-ICV into one or more SEQ-ICV segments, and determine a plurality of insertion locations for each of the SEQ-ICV segments within the IPsec packet. The transmitting node may also be configured to insert the SEQ-ICV segments into one or more locations within the IPsec packet, and transmit the IPsec packet to a receiving node. The transmitting node may generate the SEQ-ICV using the sequence number and a secret parameter shared between the transmitting node and receiving node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein are various example embodiments for filtering out invalid IPsec packets (e.g. DDOS attack packets) that pass the anti-replay window. The invalid IPsec packets may be filtered out before the IPsec protocol performs the ICV check. A transmitting and a receiving node may generate a SEQ-ICV for each IPsec packet that may be separate and independent from the ICV check within the IPsec protocol. The SEQ-ICV may be generated based on header (e.g. sequence number) and/or payload information (e.g. cipher text) within each of the IPsec packets, and a secret parameter (e.g. an authentication key) known between the transmitting node and the receiving node. The transmitting node may insert the generated SEQ-ICV values into each of the IPsec packets and transmit the IPsec packets to the receiving node. For each IPsec packet that the receiving node receives, the receiving node may extract and perform an SEQ-ICV check that compares the received SEQ-ICV with a locally generated SEQ-ICV to determine whether the received SEQ-ICV matches the locally generated SEQ-ICV. IPsec packets that do not have matching SEQ-ICV values fail the SEQ-ICV check and the receiving node may subsequently reject the IPsec packets. Alternatively, IPsec packets that pass the SEQ-ICV check may proceed to the ICV check for further authentication. The SEQ-ICV check may be performed any time before the ICV check (e.g. either before or after anti-replay check depending on the network policy and situation).

Figure 1:
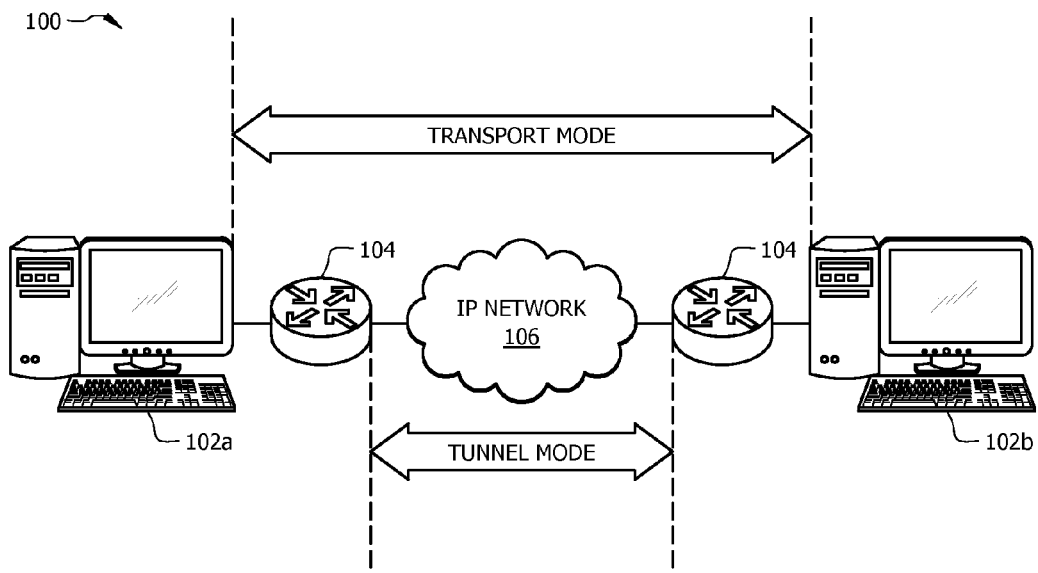
FIG. 1 is a schematic diagram of an example embodiment of a network system where example embodiments of the present disclosure may operate.

FIG. 1 is a schematic diagram of an example embodiment of a network system 100 where embodiments of the present disclosure may operate. The network system 100 may be any network system that is configured to implement the IPsec security architecture as defined in RFC 4301. The network system may comprise end nodes 102a and 102b that communicate with each other via IP network 106. IP network 106 may be any network that supports IP communication and the IPsec security architecture. For example, IP network 106 may be a network that supports IP version 4 (IPv4) and/or IP version 6 (IPv6) encapsulation and security services. IPsec packets transported via the IP network 106 may be encapsulated using the Authentication Header (AH) protocol, as described in IETF RFC 4302, published December 2005, which is incorporated herein as if reproduced in its entirety, or the ESP protocol, as described in IETF RFC 4303, published December 2005, which is incorporated herein as if reproduced in its entirety. IP network 106 may comprise one or more local area networks (LANs), virtual networks, and/or wide area networks (WANs) that may operate in the electrical domain, optical domain, or a combination of both domains.

End nodes 102a and 102b may include, but are not limited to hosts, servers, storage devices or other types of end devices that may originate data into or receive data from network system 100. When end node 102a transmits an IPsec packet to end node 102b, end node 102a may be designated as the transmitting node and end node 102b may be designated as the receiving node. The designation of the transmitting node and receiving node may be reversed when end node 102b transmits an IPsec packet to end node 102a. As shown in FIG. 1, network system 100 may transmit and receive IPsec packets using transport mode. In transport mode, end nodes 102a and 102b may be configured to implement the IPsec protocol. End nodes 102a and 102b may encrypt and authenticate the payload of the IP packets, but not the header section of the IP packets. For example, the AH protocol may insert the AH header after the IP header. Thus, the IP header remains the outer header, while the AH header may be the inner header. Typically for transport mode, the AH and ESP headers are inserted after the IP header but before the next layer protocol, such as Transmission Control Protocol (TCP), User Datagram Protocol (UDP), and Internet Control Message Protocol (ICMP).

In another example embodiment, network system 100 may transmit and receive IPsec packets using tunnel mode. FIG. 1 illustrates that network system 100 may further comprise gateway nodes 104, which may include routers, firewalls, and/or other network nodes that are configured to implement IPsec. In contrast to the transport mode, in tunnel mode, the gateway nodes 104 may encrypt and/or authenticate the IPsec packet instead of end nodes 102a and 102b. The gateway nodes 104 may act as the transmitting and/or receiving nodes by transmitting and/or receiving IPsec packets. Thus, end nodes 102a and 102b do not encrypt and/or authenticate the IPsec packet when operating in tunnel mode. Additionally, in tunnel mode, the entire IP packet, including the IP header is authenticated and encrypted. For example, in the AH protocol, the AH header may be inserted before the IP header. In this instance, the IP header is an inner header (e.g. not the outer header), while the AH header is the outer header. In both the AH protocol and ESP protocol, the IP header and original IP packet may be protected in tunnel mode.

Figure 2:
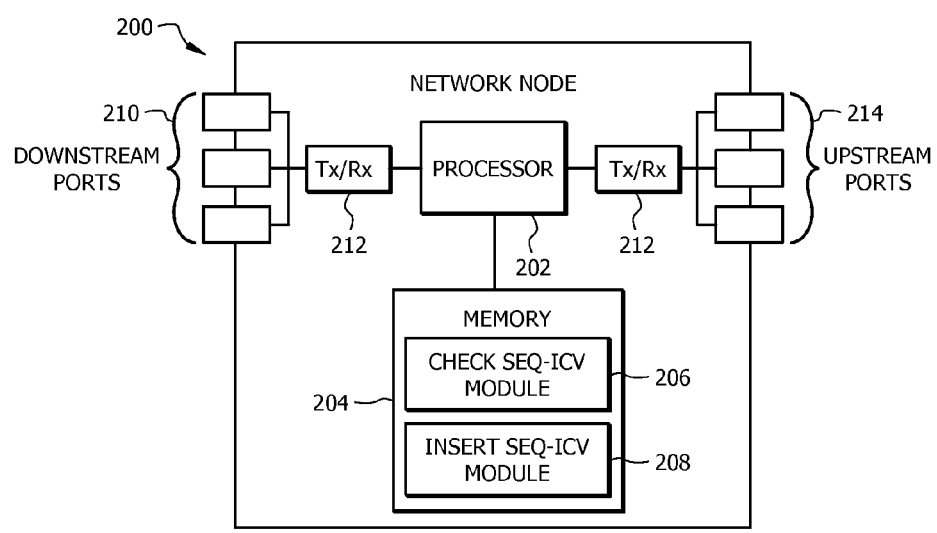
FIG. 2 is a schematic diagram of an example embodiment of a network node used to implement the IPsec protocol.

FIG. 2 is a schematic diagram of an example embodiment of a network node 200 used to implement the IPsec protocol, such as end nodes 120a and 102b, gateway nodes 104, and other transmitting/receiving nodes. Network node 200 may comprise one or more transmitter (Tx)/receiver (Rx) units 212 coupled to downstream ports 210 and upstream ports 214 used to transmit data to or receive data from other network nodes 200. The downstream ports 210 and/or upstream ports 214 may include electrical and/or optical transmitting and/or receiving components and may act as an interface to receive and/or transmit data. A processor 202 may be coupled to each of the Tx/Rx units 212 to process data (e.g. IPsec packets) and/or determine where to route data. The processor 202 may comprise one or more processors, multi-core processors, and/or memory module 204 (e.g. cache), which may function as data stores, buffers, etc. The processor 202 may be implemented as one or more central processing unit (CPU) chips, cores (e.g., a multi-core processor), field-programmable gate arrays (FPGAs), application specific integrated circuits (ASICs), and/or digital signal processors (DSPs). Although illustrated as a single processor, the processor 202 is not so limited and may comprise multiple processors. The processor 202 may be configured to implement any of the schemes described herein, including methods 300, 400, 600, 700, 800, 900, and 1000.

A memory module 204 may be coupled to the processor 202 and configured to store various types of data. Memory 204 may comprise memory devices including secondary storage, read only memory (ROM), and random access memory (RAM). The secondary storage is typically comprised of one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 204 may be used to house the instructions for carrying out the system and methods described herein, e.g., generating SEQ-ICV, inserting the SEQ-ICV in the IPsec packet, and checking the SEQ-ICV. The memory module 204 may comprise a "Check SEQ-ICV" module 206 that may be implemented on the processor 202. Alternately, the "Check SEQ-ICV" module 206 may be implemented directly on the processor 202. The "Check SEQ-ICV" module 206 may compare the locally generated SEQ-ICV with the extracted SEQ-ICV from the IPsec packet as described in method 1000 of FIG. 10. The memory module 204 may further comprise an "Insert SEQ-ICV" module 208 that generates a SEQ-ICV and inserts the SEQ-ICV into the IPsec packet as described in methods 300 and 400. Checking the SEQ-ICV and inserting the SEQ-ICV will be discussed in more detail in FIGS. 3, 4, and 10.

It is understood that by programming and/or loading executable instructions onto the network node 200, at least one of the Tx/Rx units 212, the processor 202, or the memory module 204 are changed, transforming the network node 200 in part into a particular machine or apparatus having the novel functionality taught by the present disclosure, such as the transmitting node and/or receiving node. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
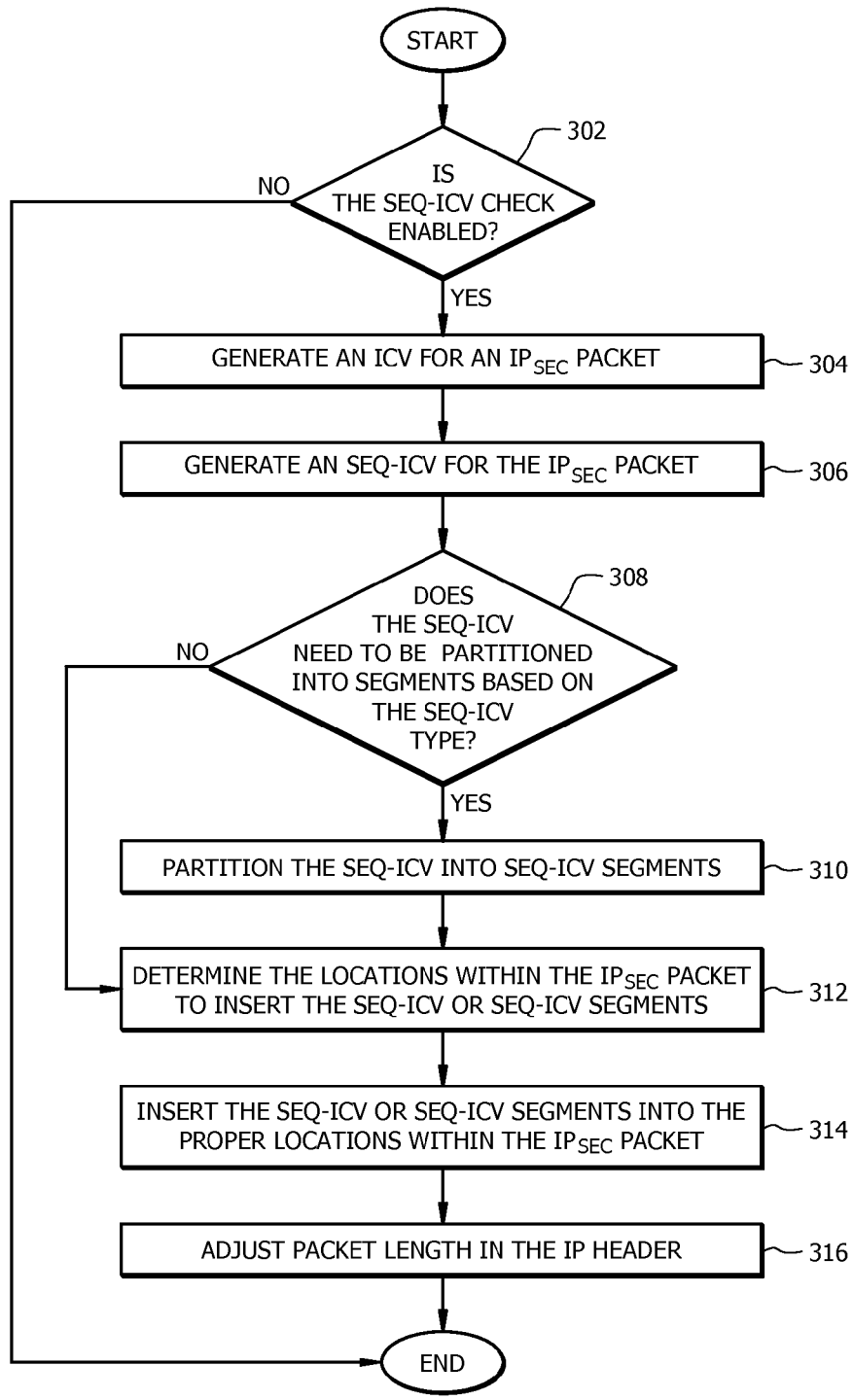
FIG. 3 is a flowchart of an example embodiment of a method that inserts a generated SEQ-ICV into an IPsec packet.

FIG. 3 is a flowchart of an example embodiment of a method 300 that inserts a generated SEQ-ICV into an IPsec packet. Method 300 may be implemented at a transmitting node for IPsec packets that are authenticated and encrypted using the AH protocol. Method 300 may be implemented in either transport or tunnel mode. Method 300 starts at block 302 to determine whether the SEQ-ICV check is enabled. The SEQ-ICV check may be dynamically enabled and/or disabled when authenticating IPsec packets. Dynamically enabling and disabling the SEQ-ICV check conserves processing time and resources by minimizing the use of the SEQ-ICV check to when a network and/or network node experiences an influx of invalid IPsec packets (e.g. DDOS attack packets). The transmitting node may receive a notification from the receiving node when to enable and/or disable the SEQ-ICV check. The receiving node may be configured with an enabling threshold value and a disabling threshold value that may be set by a network administrator. The enabling threshold value may represent the maximum number of IPsec packets that pass the anti-replay check, but have failed the ICV check. A SEQ-ICV check may be enabled when the number of packets that fail the ICV check exceeds the enabling threshold value. Using FIG. 1 as an example, end node 102b (e.g. receiving node) may receive IPsec packets from end node 102a (e.g. transmitting node). If end node 102b receives more than 50 IPsec packets (e.g. enabling threshold value) that pass the anti-replay check and fail the ICV check, then the receiving node may notify end node 102a (e.g. transmitting node) to enable SEQ-ICV.

Alternatively, the SEQ-ICV may be disabled when the number of packets that pass the anti-replay check, but fail the SEQ-ICV check falls below the disabling threshold value. The disabling threshold value may represent the minimum number of IPsec packets that pass the anti-replay check, but fail the ICV check. For example, the disabling threshold value may be set to one IPsec packet. If a receiving node receives IPsec packets that pass the anti-replay and none of the received packets fail the ICV check, then the receiving node may notify the transmitting node to disable SEQ-ICV. In this case, the receiving node may no longer be receiving invalid IPsec data.

If method 300 determines that the SEQ-ICV check is enabled, method 300 continues to block 304. Otherwise, method 300 ends when the SEQ-ICV check is disabled. At block 304, method 300 may generate an ICV for an IPsec packet as described in IETF RFC 4302. The ICV may be a checksum capable of detecting modification or invalid IPsec packets. In one example embodiment, the ICV may be generated using a Hash-based Message Authentication Code Secure Hash Algorithm Version 1 (HMAC-SHA1). After generating the ICV, the packet length field within the IP header may indicate the length of the IPsec packet before inserting the SEQ-ICV. The packet length field within the IP may be adjusted after generating ICV (e.g. block 316 of method 300) that includes the insertion of the SEQ-ICV. After method 300 generates the ICV, method 300 proceeds to block 306 and generates a SEQ-ICV for the IPsec packet.

At block 306, method 300 may generate a SEQ-ICV for the IPsec packet. The generated SEQ-ICV may be shorter in length than the ICV. Typically, the SEQ-ICV check may perform a check on a sequence number (e.g. SEQ-ICV) about four bytes long while an ICV check may check the entire IPsec packet. As a result, the processing time and consumption of computing resources may be reduced when performing a SEQ-ICV check rather than an ICV check. The SEQ-ICV may be generated using at least some or all of the sequence numbers located within the sequence number field of the header of the IPsec packet. In one example embodiment, about a four byte long SEQ-ICV may be generated using equation 1:

$$\text{SEQ-ICV-4}[n] = \text{AK}[n] \wedge \text{SEQ}[n], 0 <= n <= 3 \quad (1)$$

"SEQ-ICV-4" variable represents the SEQ-ICV and indicates that SEQ-ICV may be about four bytes long. Other example embodiments of the SEQ-ICV types will be discussed in more detail in block 308. The "AK" in equation 1 represents a secret parameter, such as an authentication key (e.g. an Advanced Encryption Standard (AES) key generated during an Internet Key Exchange (IKE) as described in IETF RFC 4306, published December 2005, which is incorporated herein as if reproduced in its entirety. The "SEQ" in equation 1 may represent the sequence numbers located within the sequence number field of the IPsec packet. The first four bytes of the AK and sequence numbers may be used to generate the SEQ-ICV. The "n" variable may represent the different byte locations and values at the byte locations for "SEQ-ICV," "AK," and "SEQ" in equation 1. For example "SEQ-ICV-4 [0]" represents the value (e.g. "00000000") at byte zero. The "^" symbol indicates that an exclusive OR (XOR) operation may be performed for the "AK" and "SEQ" variables to produce the SEQ-ICV. In another example embodiment, the SEQ-ICV may be generated using cipher text (e.g. encrypted data within the payload of the IPsec packet), "AK" variable, and "SEQ" variable. The details of this example embodiment will be discussed in FIG. 5. Other example embodiments may be used to generate SEQ-ICV so long as the resources and time used to check the SEQ-ICV is less than the ICV check.

After method 300 generates the SEQ-ICV, method 300 may proceed to block 308 and determine whether the SEQ-ICV needs to be partitioned into segments based on the SEQ-ICV type. The SEQ-ICV may be generated such that the SEQ-ICV may be partitioned into multiple segments (e.g. more than one SEQ-ICV segment) for insertion into the IPsec packet. For example, the SEQ-ICV may have a total length of about four bytes long, and may be partitioned into two different segments, with each segment about 2 bytes long. Table 1 includes a list of the different types of SEQ-ICV that may be generated by method 300:

TABLE 1

| SEQ-ICV Type | Definition of SEQ-ICV Type |
|---|---|
| SEQ-ICV-1 | One segment about one byte long |
| SEQ-ICV-2 | One segment about two bytes long |
| SEQ-ICV-3 | One segment about three bytes long |
| SEQ-ICV-4 | One segment about four bytes long |
| SEQ-ICV-1-1 | A total length of about two bytes long; partitioned into two segments with each segment about one byte long |
| SEQ-ICV-1-2 | A total length of about three bytes long; partitioned into two segments with one segment about one byte long and the second segment about two bytes long |
| SEQ-ICV-1-1-1 | A total length of about three bytes long; partitioned into three segments with each segment about one byte long |

TABLE 1-continued

| SEQ-ICV Type | Definition of SEQ-ICV Type |
|---|---|
| SEQ-ICV-1-3 | A total length of about four bytes long; partitioned into two segments with one segment about one byte long and the second segment about three bytes long |
| SEQ-ICV-2-2 | A total length of about four bytes long; partitioned into two segments with each of the segments about two bytes long |
| SEQ-ICV-1-1-2 | A total length of about four bytes long; partitioned into three segments with two segments that are each about one byte long and the third segment about two bytes long |
| SEQ-ICV-1-1-1-1 | A total length of about four bytes long; partitioned into four segments with each segment about one byte long |

As shown in Table 1, the SEQ-ICV Type column of Table 1 lists a variety of ways the SEQ-ICV may be partitioned into segments. Each number after "SEQ-ICV" that are separated by a dash (e.g. SEQ-ICV-1-1-1) within the SEQ-ICV Type column represents a SEQ-ICV segment, while the value of the number indicates the length of the SEQ-ICV segment. For example, "SEQ-ICV-1-1-1" has three different numbers after "SEQ-ICV" that are each separated with a dash, and thus the SEQ-ICV may be partitioned into three different SEQ-ICV segments. Each number has a value of one, which indicates that each segment is about one byte long. As a result, the generated SEQ-ICV may have a total length of about three bytes long when combining the three different SEQ-ICV segments. SEQ-ICV types "SEQ-ICV-1," "SEQ-ICV-2," "SEQ-ICV-3," and "SEQ-ICV-4" may not be partitioned because only one number appears after "SEQ-ICV," and thus the SEQ-ICV may be inserted as one segment. Although Table 1 presents SEQ-ICV types with lengths of about four bytes or less, other example embodiments of the SEQ-ICV types may be more than four bytes long.

At block 308, if method 300 determines that the SEQ-ICV does not need to be partitioned, then method 300 moves to block 312. However, if method 300 determines the SEQ-ICV needs to be partitioned, then method 300 moves to block 310 and partitions the SEQ-ICV into SEQ-ICV segments. Afterwards, method 300 may continue to block 312 and determine the location within the IPsec packet to insert the SEQ-ICV or SEQ-ICV segments. The SEQ-ICV and SEQ-ICV segments may be inserted anywhere in the IPsec packet after the AH header. For example, the SEQ-ICV may be inserted right after the AH header at the beginning of the payload of the IPsec packet, at the middle of the payload of the IPsec packet, and/or at the end of the IPsec packet. In one example embodiment, the location of a SEQ-ICV that is about four bytes long may be derived by equation 2:

$$\text{Offset in Payload} = \text{SEQ-ICV-4} \% \text{ Payload Length} \quad (2)$$

The "SEQ-ICV-4" variable may represent the value of the SEQ-ICV, which may be about four bytes long. Equation 2 may be used for other types of SEQ-ICV as discussed at block 308. Equation 2 may be used to determine the insertion locations for each of the SEQ-ICV segments. The "Payload Length" variable may represent the total length of the payload before the insertion of the SEQ-ICV. The "Offset in Payload" variable indicates the insertion location of the SEQ-ICV within the payload by indicating the payload offset. The "Offset in Payload" variable may have unit definition in bytes. For example, if the "Offset in Payload" variable has a value of one, then the payload offset is one byte. The symbol "%" may represent a modulo operation that determines the remainder of the value of the "SEQ-ICV-4" variable divided by the value of the "Payload Length" variable. For example, if the "SEQ-ICV-4" has a value of five and the "Payload Length" has a value of four, then the remainder would be one. In this instance, the "Offset in Payload" would have a value of one, and thus the insertion location of SEQ-ICV-4 would be inserted at the offset of about one byte from the start of the payload. The start of the payload may be the next section after the AH header ends in the IPsec packet.

In another example embodiment of block 308, method 300 may determine the location of the SEQ-ICV segments based on equation 3:

$$\text{Offset in payload} = \max \text{ of (SEQ-ICV-4\% Payload Length, max of (IV-length,8))} \qquad (3)$$

As shown above in equation 3, the "Offset in payload" is the greater of the "SEQ-ICV-4% Payload Length" as described in equation 2 and the "max of (IV-length, 8))." In other words, in instances where "SEQ-ICV-4% Payload Length" produces a greater value than the "max of (IV-length, 8))," the "Offset in payload" may equal "SEQ-ICV-4% Payload Length." Additionally, when SEQ-ICV-4% Payload Length" produces a lesser value than the "max of (IV-length, 8))," the "Offset in payload" may equal "max of (IV-length, 8))." The "IV-length" variable represents the length of initialization vector. If present, the initialization vector may immediately follow the sequence number within an IPsec packet. The initialization vector may be used when generating the SEQ-ICV. However, the insertion location of the SEQ-ICV and/or SEQ-ICV segments may be after the initialization vector. In one example embodiment, the "IV-length" may be about eight bytes long, while in another example embodiment the "IV-length" may be about 16 bytes long. Thus, the "max of (IV-length, 8))" function produces a resultant value that is at least eight bytes long when determining the offset in the payload of the IPsec packet. In this instance, if the initialization vector is used to generate the SEQ-ICV, the SEQ-ICV and/or SEQ-ICV segments may be inserted after the first eight bytes in the payload of the IPsec packet.

After method 300 determines the location of the SEQ-ICV or the SEQ-ICV segments, method 300 may proceed to block 314 and insert the SEQ-ICV or SEQ-ICV segments into the proper locations within the IPsec packet. Inserting the SEQ-ICV and/or SEQ-ICV segments into the IPsec packet will be discussed in more detail in FIGS. 6A-6C. After the insertion of the SEQ-ICV or SEQ-ICV segments, method 300 continues to block 316 and adjusts the packet length value in the IP header. The updated packet length value in the IP header may be used to account for the additional bytes inserted into the IPsec packet.

Figure 4:
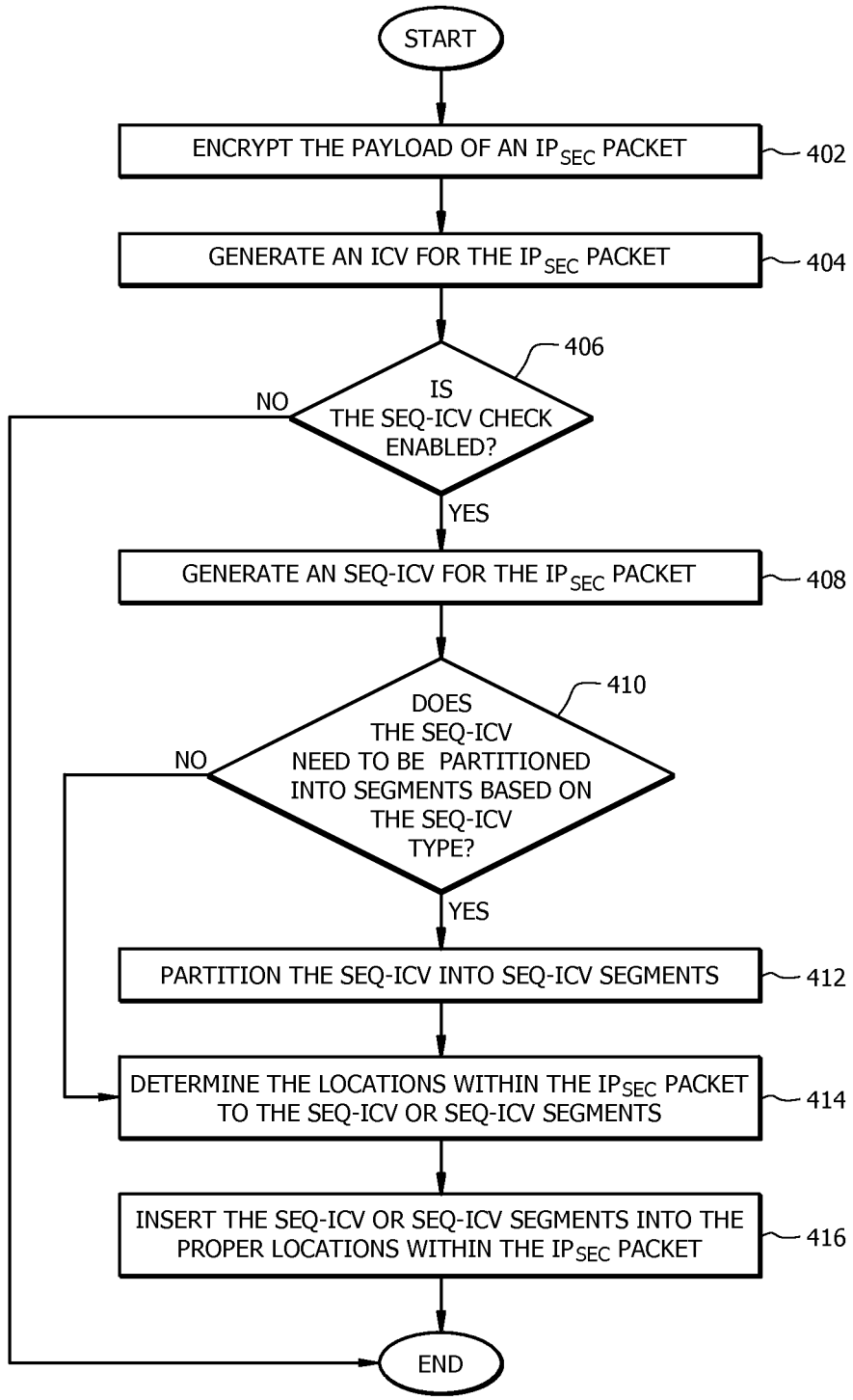
FIG. 4 is a flowchart of another example embodiment of a method that inserts a generated SEQ-ICV into an IPsec packet.

FIG. 4 is a flowchart of another example embodiment of a method 400 that inserts a generated SEQ-ICV into an IPsec packet. Method 400 may be implemented at a transmitting node for IPsec packets authenticated and encrypted using the ESP protocol instead of the AH protocol as described in method 300. Similar to method 300, method 400 may also be implemented in transport and/or tunnel mode. Method 400 may start at block 402 and encrypt the payload of the IPsec packet and then proceed to block 404. Block 404 may be substantially similar to block 304 of method 300, except that method 400 may generate an ICV for an IPsec packet as described in IETF RFC 4303. Afterwards, method 400 may proceed to block 406. Blocks 406, 408, 410, 412, 414, and 416 are substantially similar to blocks 302, 306, 308, 310, 312, and 314 of method 300, respectively, except that the IPsec packet is authenticated and encrypted using the ESP protocol.

Figure 5:
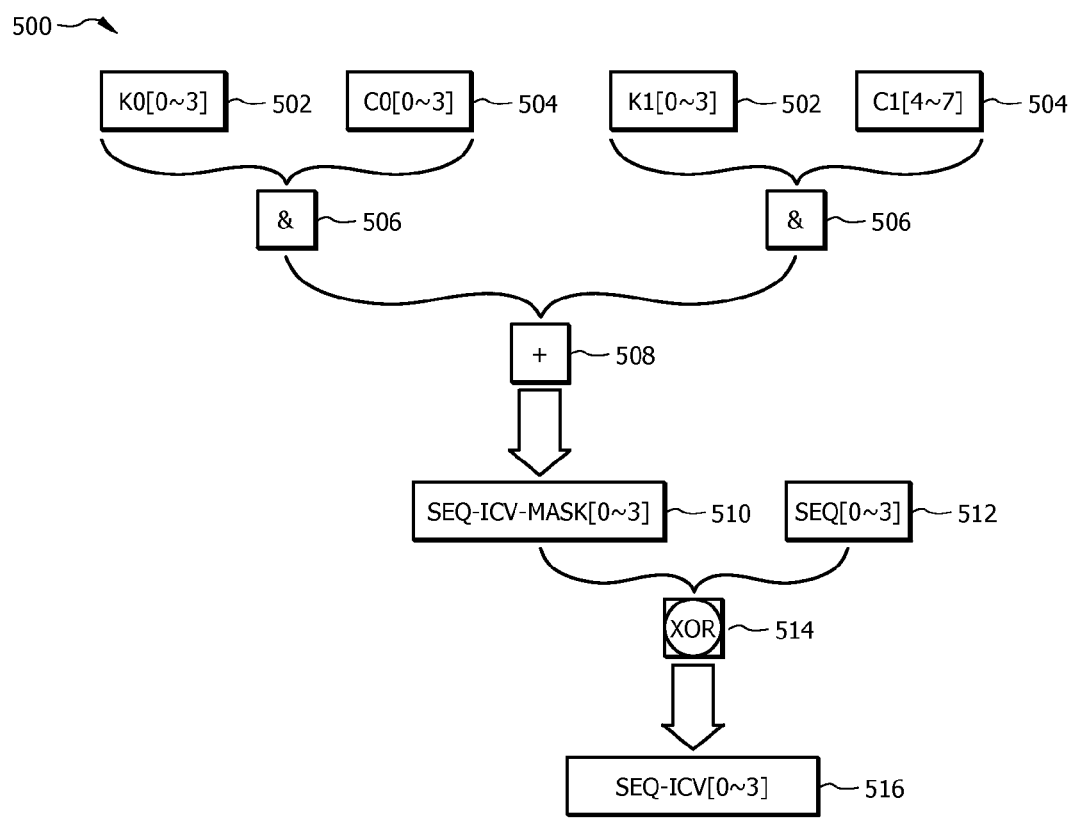
FIG. 5 is a computational flow diagram of an example embodiment of a SEQ-ICV generation method.

FIG. 5 is a computational flow diagram of an example embodiment of a SEQ-ICV generation method 500. SEQ-ICV generation method 500 may be used to generate the SEQ-ICV for both the transmitting node and receiving node. As described in block 306 of method 300, the SEQ-ICV may be generated using equation 1. FIG. 5 illustrates another example embodiment that generates SEQ-ICV using the sequence numbers located within the sequence number field of an IPsec packet, a secret parameter known to the transmitting node and the receiving node, and cipher text (e.g. encrypted data within the payload) to produce the SEQ-ICV [0~3] 516. SEQ-ICV generation method 500 may start by obtaining key values 502 and cipher text values 504. The cipher text 504 may represent encrypted data within the payload of the IPsec packet. In one example embodiment, the cipher text 504 may represent the first eight bytes of the payload. Cipher text C0[0~3] 504 may correspond to the first four bytes (e.g. bytes 0-3) of the payload, while Cipher text C1[4~7] 504 may correspond to the second four bytes (e.g. bytes 4-7) of the payload.

Key value K0[0~3] and K1[0~3] 502 may be any secret parameter known to both the transmitting node and receiving node and not shared with other network nodes. For example, the key values may be keys that were negotiated through IKE when first establishing a connection for the transmitting node and receiving node. In one example embodiment, the key value K0[0~3] 502 may represent the first four bytes of the authentication key (e.g. AES key), while K1[0~3] 502 may represent the first four bytes of another key negotiated through IKE. An additional key may be negotiated through IKE when the authentication key is less than about eight bytes long. In another example embodiment, key value K0[0~3] 502 may represent the first four bytes of the authentication key (e.g. AES key), while key value K1[0~3] 502 may represent the next four bytes of the authentication key. Other example embodiments of the key value 502 may be less than about four bytes long or more than about four bytes long.

After obtaining the key values 502 and cipher text 504, a bit operation may be performed for the key values 502 and cipher text 504. FIG. 5 illustrates that an "AND" operation, represented by the "&" symbol, may be performed for key value K0[0~3] 502 and cipher text C0[0~3] 504, while a second "AND" operation may be performed for key value K1[0~3] 502 and cipher text C1[4~7] 504. A bit addition operation 508, represented by the "+" symbol, may subsequently be performed on the two resultants of the "AND" operations to generate SEQ-ICV-Mask [0~3] 510. In FIG. 1, the SEQ-ICV-Mask [0~3] 510 may be about four bytes long. An "XOR" bit operation may be performed against the SEQ-ICV-Mask [0~3] 510 and the SEQ [0~3] 512. The SEQ[0~3] 512 may represent the sequence numbers located in the sequence number field of the IPsec packet. The SEQ[0~3] 512 may be about four bytes long. Implementing the "XOR" bit operation 514 may produce SEQ-ICV [0~3] 516, which may be about four bytes long. Method 500 may generate SEQ-ICV that may be less than three bytes long or more than four bytes long.

Figure 6A:
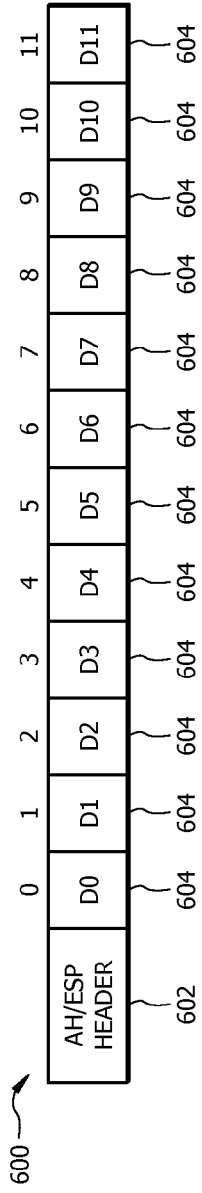
FIG. 6A is a schematic diagram of an example embodiment of an IPsec packet after the generation of the ICV, but prior to the insertion of the SEQ-ICV.
Figure 6B:
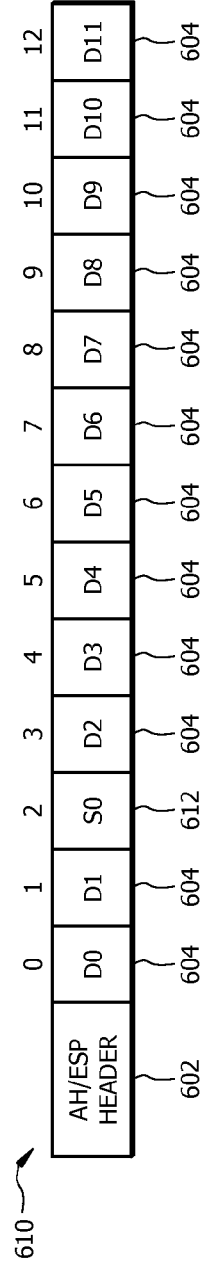
FIG. 6B is a schematic diagram of another example embodiment of an IPsec packet.
Figure 6C:
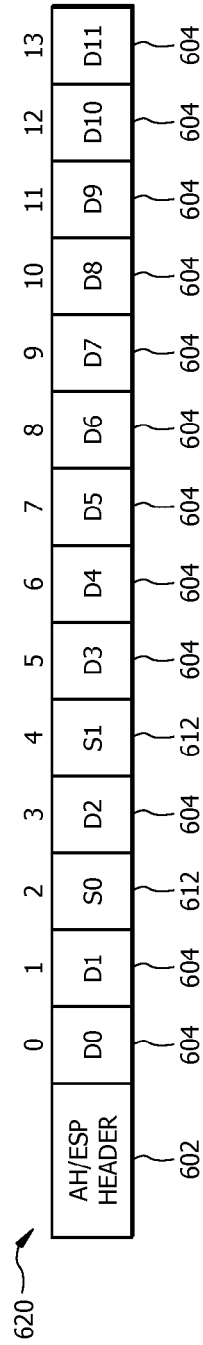
FIG. 6C is a schematic diagram of another example embodiment of an IPsec packet.

FIGS. 6A-6C demonstrate an insertion process of SEQ-ICV segments within an IPsec packet as described in blocks 312 and 314 in method 300. FIG. 6A is a schematic diagram of an example embodiment of an IPsec packet 600 after the generation of the ICV, but prior to the insertion of the SEQ-ICV. FIG. 6A illustrates that the IPsec packet 600 may comprise an AH/ESP header 602 and a plurality of payload data D0-D11 604 located in the payload of the IPsec packet 600. Each of the payload data D0-D11 604 may be about one byte long and may be located at different payload offset locations within the payload of the IPsec packet 600. For example, in FIG. 6A, payload data D0 604 may be located at the start of the payload with a payload offset of zero; payload data D1 604 may follow payload data D0 604 and may be located at the payload offset of one location; payload data D2 604 may trail payload data D1 604 and may be located at the payload offset of two location, and payload data D3 604 may be located after payload data D2 604 and may be located at the payload offset of three location. As shown in FIG. 6A, the locations of payload data D4-D11 604 continue the same pattern as described for payload data D0-D3 604.

FIG. 6B is a schematic diagram of another example embodiment of an IPsec packet 610 after the insertion of SEQ-ICV segment S0 612. FIG. 6B illustrates that SEQ-ICV segment S0 612 may be about one byte long and may be located at the payload offset of two position within the payload of the IPsec packet 610. As previously discussed in block 312 of method 300 and equation 2, the insertion position of the payload may be represented by the "Offset in Payload" variable. The SEQ-ICV segment S0 612 may be inserted at the payload offset of two position when the "Offset in Payload" variable in equation 2 has a value of two. After the insertion of SEQ-ICV segment S0 612, SEQ-ICV segment S0 612 may be located after the payload data D1 604 and before payload data D2 604.

FIG. 6C is a schematic diagram of another example embodiment of an IPsec packet 620 after the insertion of SEQ-ICV segment S1 612. As discussed above in FIG. 3 and method 300, the SEQ-ICV may be partitioned into two or more SEQ-ICV segments. Each of the SEQ-ICV segments 612 may be inserted after the AH/ESP header 602. In FIG. 6C, SEQ-ICV segment S0 612 may be inserted at the payload offset of two position, while SEQ-ICV segment S1 612 may be inserted at the payload offset of four position. Different "Offset in Payload" values from equation 2 may be calculated for each of the SEQ-ICV segments 612. Similar to SEQ-ICV segment S0 612, SEQ-ICV segment S1 612 may be about one byte long and may be inserted after the insertion of SEQ-ICV segment S0 612. As such, SEQ-ICV segment S1 612 is located between payload data D2 604 and payload data D3 604. In another example embodiment, IPsec packet 602 may exist such that the SEQ-ICV segments 612 may overlap each other.

Figure 7:
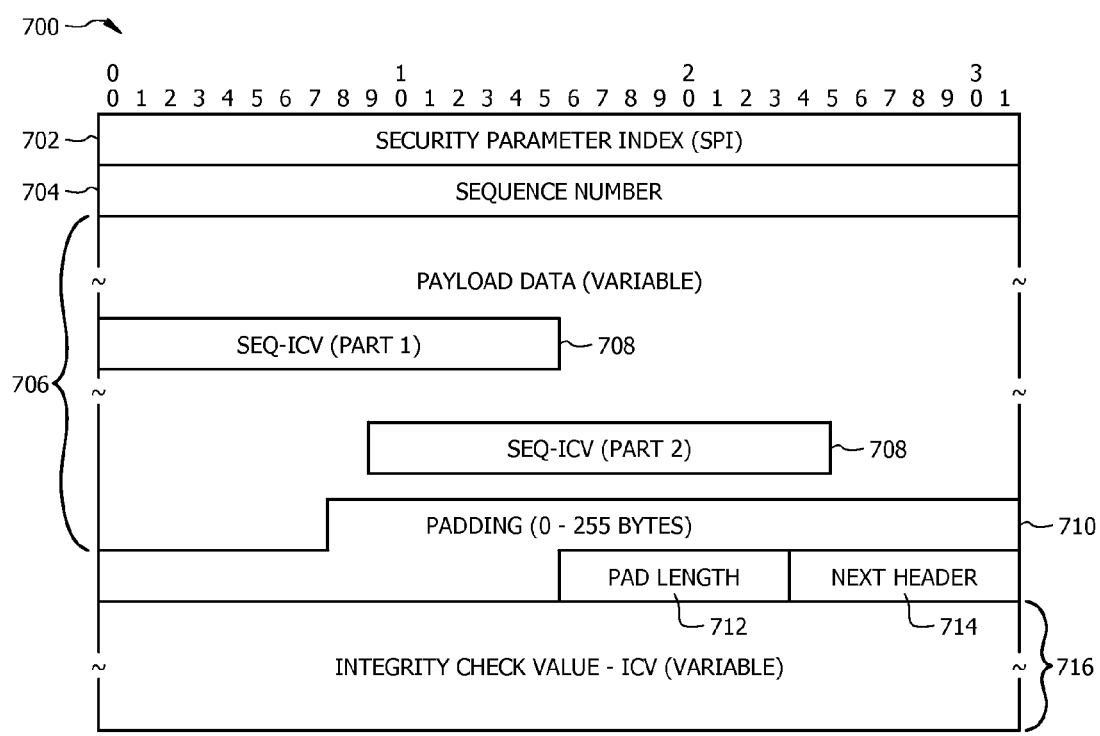
FIG. 7 is a schematic diagram of another example embodiment of an IPsec packet encoded using the Encapsulating Security Payload (ESP) protocol after the insertion of the SEQ-ICV segments.

FIG. 7 is a schematic diagram of another example embodiment of an IPsec packet 700 encoded using the ESP protocol after the insertion of SEQ-ICV segments 708. The IPsec packet 700 may comprise the security parameter index (SPI) field 702, a sequence number field 704, a payload data 706, padding 710, a padding length field 712, a next header field 714, and the ICV field 716, all of which are defined in RFC 4303. The SPI field 702 may be about four bytes long and may be used to identify the Security Association for the IPsec packet 700. The Security Association for the IPsec packet 700 may be one or more algorithms and parameters (e.g. AES key) used to encrypt and authenticate the IPsec packet 700. The sequence number field 704 may be about four bytes long and may represent a counter value that is associated with each IPsec packet that is sent and received by the transmitting node and receiving node, respectively. In another example embodiment (e.g. not shown in FIG. 7), the sequence number may be about eight bytes long. The payload data 706 may vary in length and may include data from the IP packet encrypted and encapsulated by the IPsec packet 700. The padding field 710 may range from about zero bytes to about 255 bytes and may be used to adjust the length of the IPsec packet to a pre-requisite size dictated by encryption algorithm(s), align the ICV field to a four-byte boundary, and/or conceal the length of the payload data 706. The pad length field 712 may be about one byte long and indicate the length of the padding field. The next header field 714 may be about one byte long and identifies the type of data included in the payload data 706 (e.g. IPv4 or IPv6 data packets). The ICV field 716 may vary in length and may provide the ICV values used to perform ICV checks. FIG. 7 also illustrates that two SEQ-ICV segments 708 may be inserted within the payload data 706 after encrypting the payload data 706. The SEQ-ICV segments are substantially similar to the SEQ-ICV segments 612 discussed in FIG. 6C.

Figure 8:
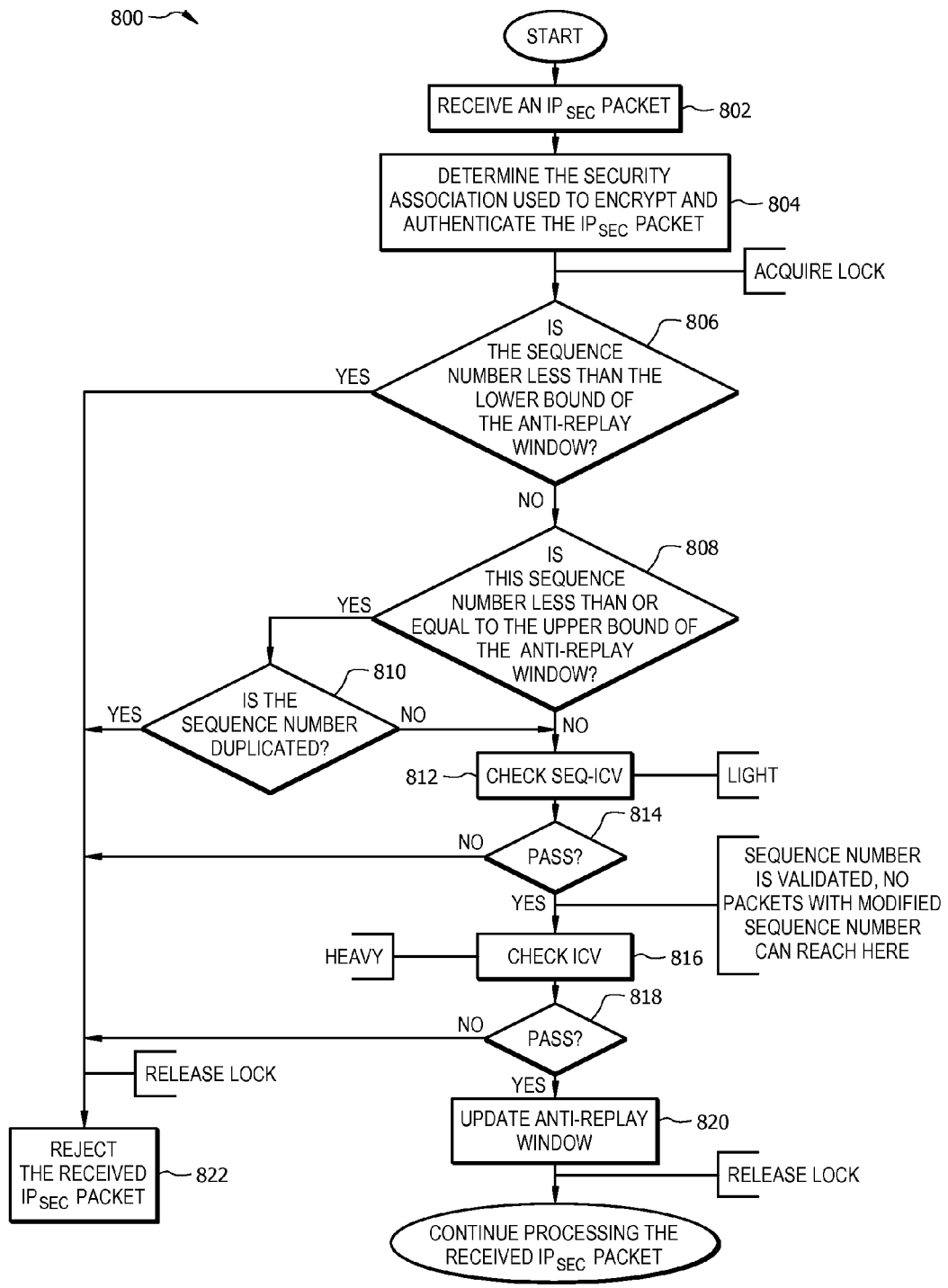
FIG. 8 is a flowchart of an example embodiment of a method that authenticates an IPsec packet received at a receiving node.

FIG. 8 is a flowchart of an example embodiment of a method 800 that authenticates an IPsec packet received at a receiving node. FIG. 8 illustrates that method 800 may check the SEQ-ICV (e.g. block 812) at the receiving node after checking the sequence number with the anti-replay window (e.g. blocks 806, 808, and 810). In another example embodiment, method 800 may check the SEQ-ICV before checking the sequence number with the anti-replay window. Method 800 may start at block 802 and receive an IPsec packet. After method 800 receives the IPsec packet, method 800 may proceed to block 804 and determine the Security Association used to encrypt and authenticate the IPsec packet. Recall in FIG. 7 that an IPsec packet 700 may have a SPI field 702 used to identify the Security Association information. Method 800 may use data within the SPI field 702 to determine the Security Association information for the IPsec packet received in block 802. At this point, method 800 may acquire a lock for the IPsec packet that prevents modification of the IPsec packet at block 804.

Method 800 may continue to blocks 806, 808, and 810 to check the sequence number within the IPsec packet against the anti-replay window. At block 806, method 800 determines if the sequence number found within the received IPsec packet is less than the lower bound of the anti-replay window. Recall in FIG. 7, an IPsec packet may be encoded with the sequence number field 704. The sequence number value found within the sequence number field 704 may be compared with the anti-replay window. If the sequence number within the sequence number field 704 in the received IPsec packet is less than the lower bound of the anti-replay window, then method 800 moves to block 822 and rejects the received IPsec packet. Alternatively, if the sequence number is not less than (e.g. greater than) the lower bound of the anti-replay window, then method 800 proceeds to block 808. At block 808, method 800 determines whether the sequence number is less than or equal to the upper bound of the anti-replay window. If the sequence number is less than or equal to the upper bound of the anti-replay window, then method 800 proceeds to block 810. At block 810, method 800 determines whether the sequence number is a duplicated number. If the sequence number is duplicated, then method 800 proceeds to block 822 and rejects the received IPsec packet. However, if the sequence number is not a duplicate, then method 800 continues to block 812.

Returning to block 808, if method 800 determines that the sequence number is not less than or equal to the upper bound of the anti-replay window (e.g. the sequence number is greater than the upper bound of the anti-replay window), then method 800 may move to block 812 and check the SEQ-ICV. The SEQ-ICV may be a lighter check than checking the ICV at block 816, and may filter or reject packets with modified sequence numbers. The SEQ-ICV check may extract and compare the SEQ-ICV received within the IPsec packet to a locally generated SEQ-ICV. Method 800 may locally generate the SEQ-ICV substantially similar to FIG. 3 (e.g. block 306) and/or FIG. 5 using information within the received IPsec packet. Block 812 will be discussed in more detail in FIG. 10. After method 800 completes block 812, method 800 may move to block 814 and determines whether the IPsec packet passed the SEQ-ICV check. If the received IPsec packet fails (e.g. does not pass) the SEQ-ICV check, method 800 proceeds to block 822 and rejects the received IPsec packet. If the received IPsec packet passes the SEQ-ICV check, then the sequence number is validated.

Method 800 may subsequently proceed to block 816 after an IPsec packet passes the SEQ-ICV check. Method 800 may perform an ICV check at block 816, which may be a heavier check in regards to time consumption and resources compared to the SEQ-ICV check at block 812. Method 800 then continues to block 818 to determine whether the received IPsec frame passed the ICV check at block 816. If method 800 determines that the received IPsec frame failed the ICV check, then method 800 moves to block 822. If method 800 determines that the received IPsec frame passed the ICV check, then method 800 continues to block 820 and updates the anti-replay window. Afterwards, method 800 releases the lock on the anti-replay window, and continues processing the received IPsec packet. The lock on the anti-replay window prevents the anti-replay window from being checked and updated by different IPsec packets. In other words, the lock allows only one IPsec packet to update the anti-replay window at a given time.

Figure 9A:
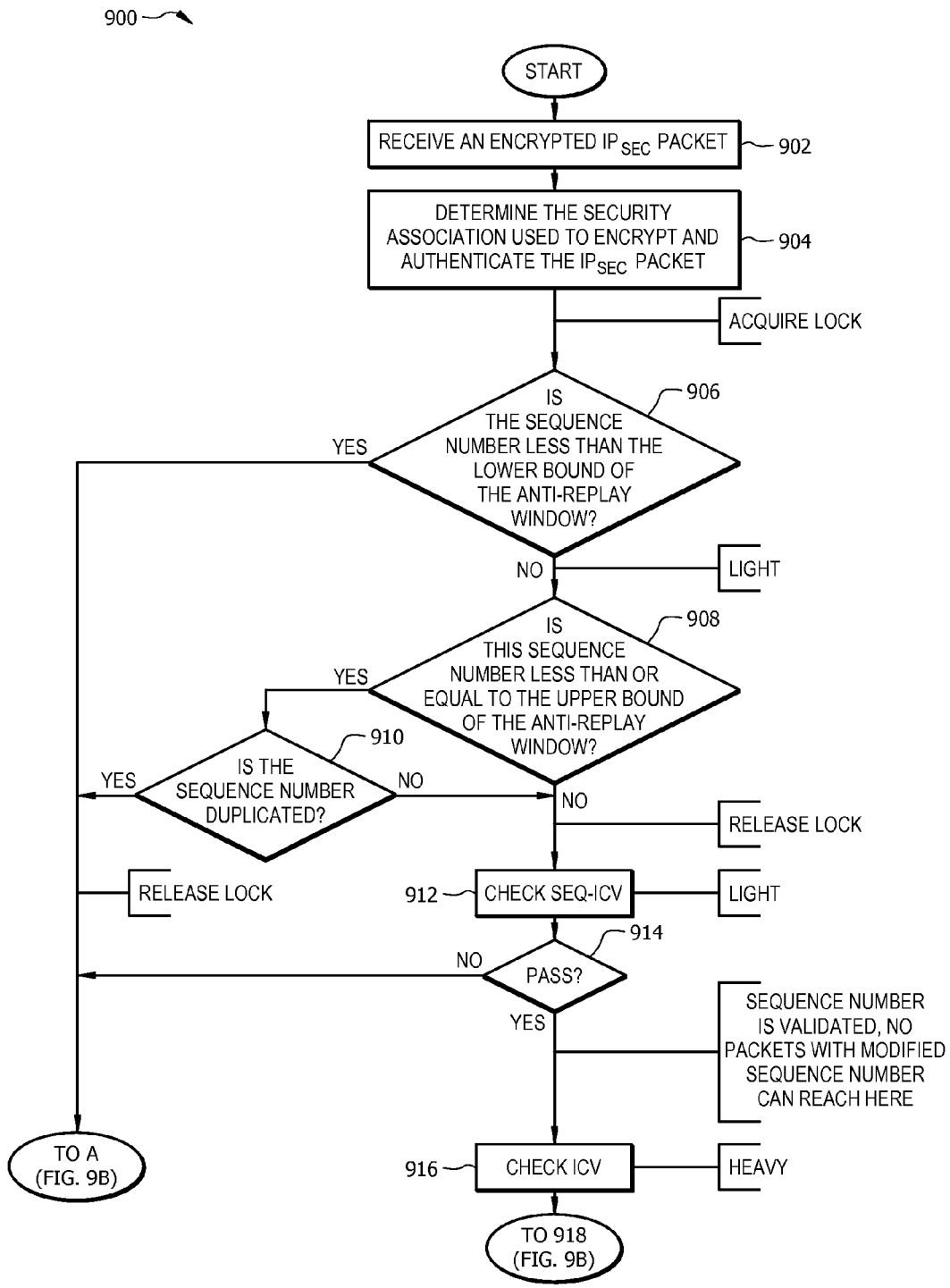
FIG. 9A is a flowchart of another example embodiment of a method that authenticates an IPsec packet received at a receiving node.
Figure 9B:
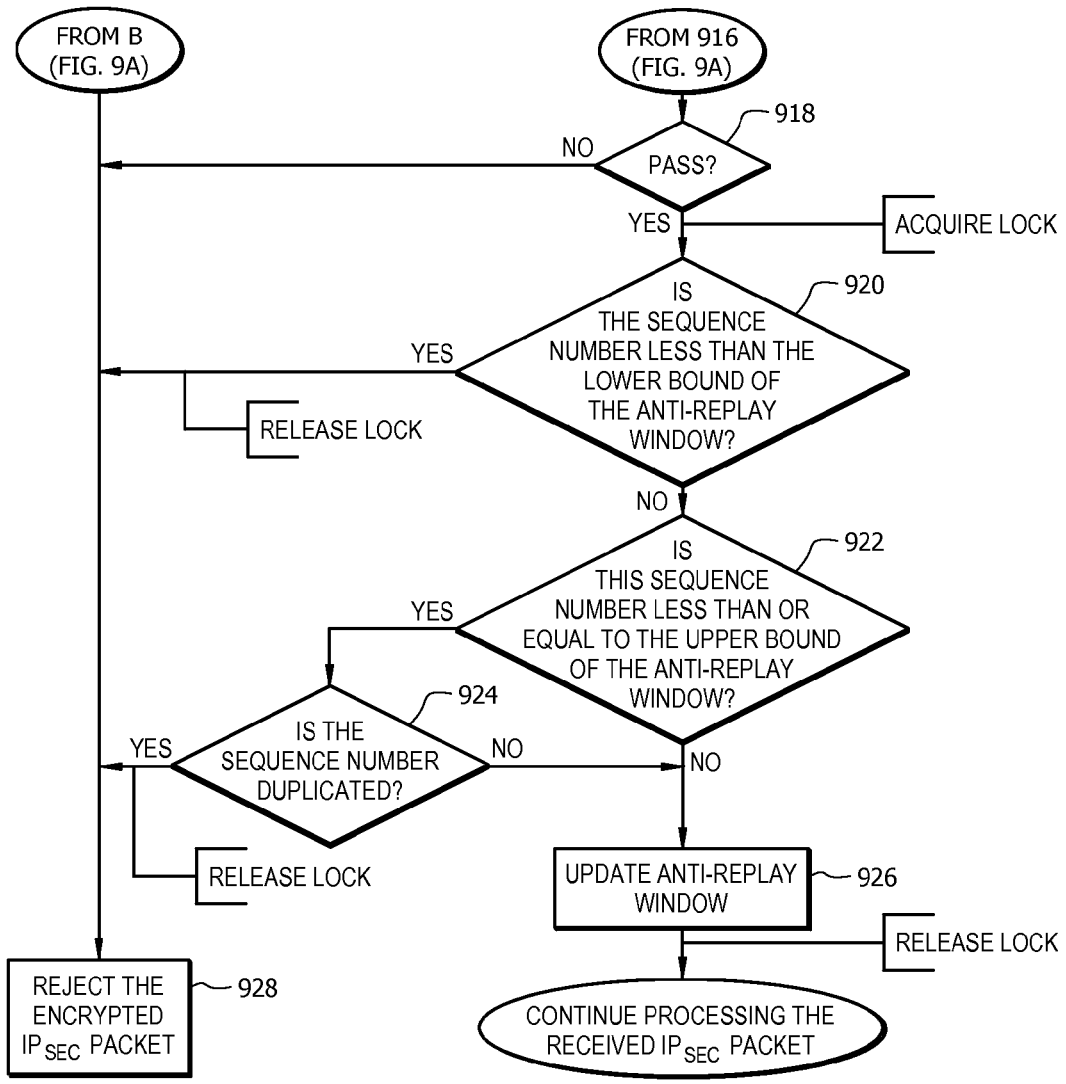
FIG. 9B is a flowchart of another example embodiment of a method that authenticates an IPsec packet received at a receiving node.

FIGS. 9A and 9B are a flowchart of another example embodiment of a method 900 that authenticates an IPsec packet received at a receiving node. Blocks 902-918, 926, and 928 of method 900 are substantially similar to blocks 802-818, 820, and 822 of method 800, respectively. In contrast to FIG. 8, FIGS. 9A and 9B illustrate that the lock for the received IPsec packet may be released prior to block 912, which checks the SEQ-ICV. A second lock may be acquired at block 920. At blocks 920, 922, and 924, method 900 may check the sequence number against the anti-replay window. Checking of the sequence number against the anti-replay window may be substantially similar to blocks 806, 808, and 810 of method 800. Method 900 may implement a second check of the sequence number because the lock was released at block 912 when performing the SEQ-ICV check.

Figure 10:
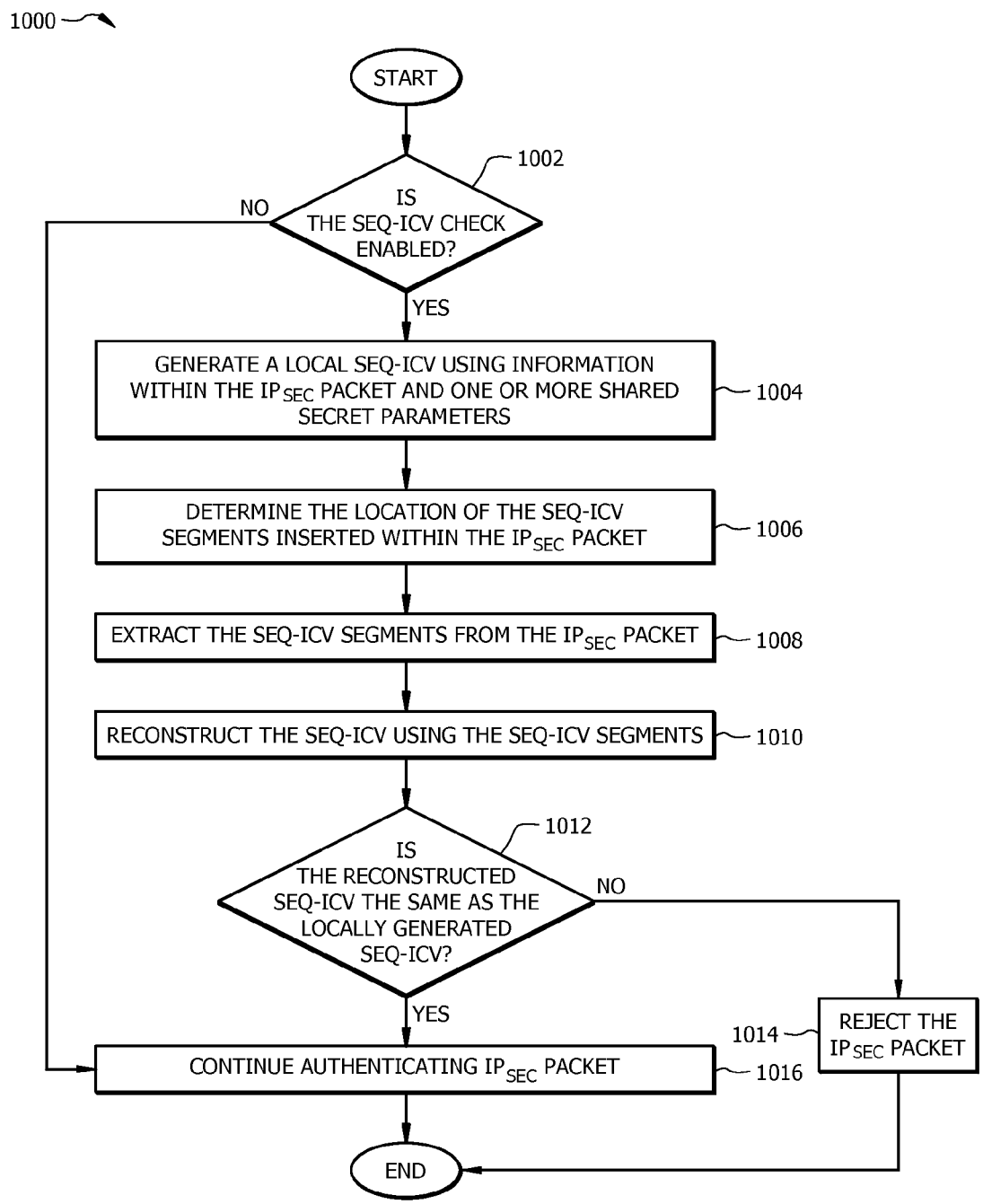
FIG. 10 is a flowchart of an example embodiment of a method that checks the SEQ-ICV at a receiving node.

FIG. 10 is a flowchart of an example embodiment of a method 1000 that checks the SEQ-ICV at a receiving node. Method 1000 may be used for IPsec packets authenticated and encrypted using the AH protocol or the ESP protocol. Method 1000 may also be used for IPsec packets that are transmitted and received using transport mode or tunnel mode. Method 1000 may start at block 1002 and determine if the SEQ-ICV check is enabled. As discussed in FIG. 3, the receiving node may notify the transmitting node whether to enable the SEQ-ICV check based on an enabling threshold value and a disabling threshold value that may be set by a network administrator. Method 1000 implemented at the receiving node may consider the SEQ-ICV check disabled and stop performing the SEQ-ICV check when the receiving node receives IPsec packets that pass the ICV check, but fail the SEQ-ICV check. The SEQ-ICV check may be enabled when the receiving node receives IPsec packets that pass both the ICV check and the SEQ-ICV check.

Recall for method 300 in FIG. 3, the transmitting node may receive an enable or disable notification from the receiving node. A delay period may exist between the time the receiving node transmits a notification to the time the transmitting node receives the notification and inserts or stops inserting a SEQ-ICV within an IPsec packet. Once the receiving node receives the IPsec packets that have the SEQ-ICV (e.g. enabling SEQ-ICV) or are missing the SEQ-ICV (e.g. disabling SEQ-ICV), the receiving node may consider the SEQ-ICV check enabled or disabled, respectively. For example, the receiving node may transmit an enable notification to the transmitting node to instruct the transmitting node to insert the SEQ-ICV into the transmitted IPsec packet. A delay period exists between the time the receiving node transmits the notification and when the receiving node receives the first IPsec packet that comprises a SEQ-ICV. During the delay period, the receiving node may receive one or more legitimate IPsec packets that may pass the ICV check but fail the SEQ-ICV check. The legitimate IPsec packets may fail the SEQ-ICV check because the transmitting node may have already transmitted the IPsec packets before receiving the SEQ-ICV enable notification. As such, method 1000 may start to reject packets that fail the SEQ-ICV check after the previously received IPsec packets pass both the ICV check and the SEQ-ICV check. For disabling the SEQ-ICV check, method 1000 may stop checking SEQ-ICV once the receiving node receives IPsec packets that pass the ICV check and fail the SEQ-ICV check.

If method 1000 determines that SEQ-ICV is disabled, then method 1000 continues to block 1016 and continues authenticating the IPsec packet (e.g. ICV check or anti-replay window). Conversely, if method 1000 determines that the SEQ-ICV is enabled, then method 1000 may move to block 1004 and generate a local SEQ-ICV using information within the received IPsec packet and one or more shared secret parameters (e.g. authentication key). The local SEQ-ICV may be generated using methods described in FIGS. 3 and 5. Method 1000 may then move to block 1006 and determine the location of the SEQ-ICV segments inserted within the IPsec packet. Method 1000 may implement block 1006, which is substantially similar to block 312 of method 300 in FIG. 3.

Method 1000 may then proceed to block 1008 and extract the SEQ-ICV segments from the IPsec packet. As discussed in blocks 310 and 312 of method 300 in FIG. 3, the SEQ-ICV segments may be partitioned into one or more segments. Method 1000 may extract each of the SEQ-ICV segments and then continue to block 1010. At block 1010, method 1000 may reconstruct the SEQ-ICV using the SEQ-ICV segments. Method 1000 may then move to block 1012 and compare the reconstructed SEQ-ICV with the locally generated SEQ-ICV. Method 1000 determines whether the reconstructed SEQ-ICV is the same as the locally generated SEQ-ICV. If method 1000 determines the reconstructed SEQ-ICV and the locally generated SEQ-ICV are the same, then the IPsec packet has passed the SEQ-ICV check and proceeds to block 1016 to continue the IPsec packet. Alternatively, if the method 1000 determines the reconstructed SEQ-ICV and the locally generated SEQ-ICV are different (e.g. not the same), then method 1000 may proceed to block 1014 and reject the IPsec packet.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. A method for authenticating an Internet Protocol Security (IPsec) packet, wherein the method comprises:
   receiving, by a receiving network node, the IPsec packet via an input port;
   determining one or more locations within the IPsec packet to extract one or more Sequence-Integrity Check Value (SEQ-ICV) segments located in the IPsec packet, wherein a modulo operation is used to determine the one or more locations within the IPsec packet, and wherein a length of a payload of the IPsec packet and the SEQ-ICV segments are used to perform the modulo operation;
   extracting a SEQ-ICV from the IPsec packet;
   generating, by the receiving network node, a local SEQ-ICV;
   performing, by the receiving network node, a SEQ-ICV check that validates a sequence number within the IPsec packet, wherein the SEQ-ICV check comprises comparing the SEQ-ICV with the local SEQ-ICV; and
   performing, by the receiving network node, an Integrity Check Value (ICV) check that validates a checksum within the IPsec packet, wherein the SEQ-ICV check is performed before the ICV check.

2. The method of claim 1, further comprising performing the ICV check for the IPsec packet when the IPsec packet passes the SEQ-ICV check.

3. The method of claim 2, wherein the IPsec packet passes the SEQ-ICV check when the SEQ-ICV within the IPsec packet is the same as the local SEQ-ICV.

4. The method of claim 1, further comprising rejecting the IPsec packet when the IPsec packet fails the SEQ-ICV check.

5. The method of claim 1, wherein the local SEQ-ICV is generated using an IPsec packet sequence number and a secret parameter known to an apparatus receiving the IPsec packet.

6. The method of claim 5, wherein the secret parameter is an Advanced Encryption Standard (AES) key, and wherein the SEQ-ICV is generated using a cipher text within the IPsec packet.

7. The method of claim 1, wherein the SEQ-ICV segments are extracted from the payload of the IPsec packet.

8. The method of claim 1, wherein the SEQ-ICV check is performed after an anti-replay window check, and wherein the anti-replay window check indicates whether a sequence number within the IPsec packet is duplicated.

9. An apparatus for transmitting an Internet Protocol Security (IPsec) packet, comprising:
   a processor; and
   a transmitter coupled to the processor, wherein the transmitter is configured to transmit the IPsec packet that comprises:
      a header that comprises a sequence number field that provides a sequence number; and
      a payload that comprises one or more Sequence-Integrity Check Value (SEQ-ICV) segments used to authenticate the sequence number within the IPsec packet,
   wherein a modulo operation is used to determine locations of each of the SEQ-ICV segments, and wherein a length of the payload and the SEQ-ICV segments are used to perform the modulo operation.

10. The apparatus of claim 9, wherein the modulo operation determines an offset value within the payload for each of the SEQ-ICV segments.

11. The apparatus of claim 10, wherein the offset value indicates an offset location within the payload to insert the SEQ-ICV segments.

12. The apparatus of claim 9, wherein the IPsec packet further comprises a packet length field that is updated after inserting the SEQ-ICV segments.

13. The apparatus of claim 9, wherein the SEQ-ICV segments are located in between cipher text within the payload.

14. A computer program product comprising computer executable instructions stored on a non-transitory computer readable medium such that when executed by a processor causes a node to:
   generate a Sequence-Integrity Check Value (SEQ-ICV) that represents a validity check for a sequence number located within an Internet Protocol Security (IPsec) packet;
   partition the SEQ-ICV into one or more SEQ-ICV segments;
   determine a plurality of insertion locations for each of the SEQ-ICV segments within the IPsec packet, wherein a modulo operation is used to determine the insertion locations within the IPsec packet, and wherein a length of a payload of the IPsec packet and the SEQ-ICV segments are used to perform the modulo operation;

insert the SEQ-ICV segments into the insertion locations within the IPsec packet; and forward the IPsec packet, wherein the sequence number and a secret parameter are used to generate the SEQ-ICV.

15. The node of claim 14, wherein a cipher text is used to generate the SEQ-ICV.

16. The node of claim 15, wherein the cipher text is a first eight bytes of the payload of the IPsec packet.

* * * * *